B. B. MUNROE.
WAGON BRAKE.

No. 20,504.

Patented June 8, 1858.

UNITED STATES PATENT OFFICE.

B. B. MUNROE, OF SOUTH DANSVILLE, NEW YORK.

BRAKE FOR WAGONS, &c.

Specification of Letters Patent No. 20,504, dated June 8, 1858.

*To all whom it may concern:*

Be it known that I, BENJAMIN B. MUNROE, of South Dansville, in the county of Steuben, in the State of New York, have invented certain new and useful Improvements in Wagon-Brakes; and I hereby declare that the following is a full and exact description thereof, reference being had to the accompanying drawings, making part of this specification, in which—

Figure 2:
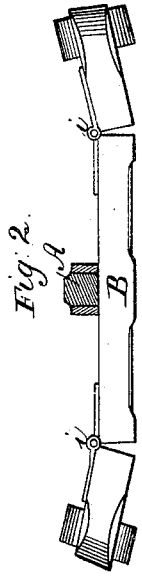
Figure 3:
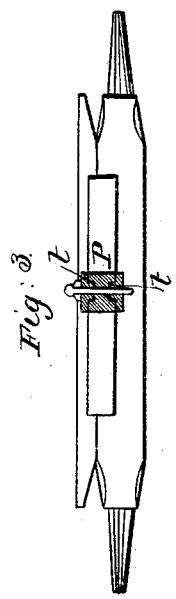
Figure 1:
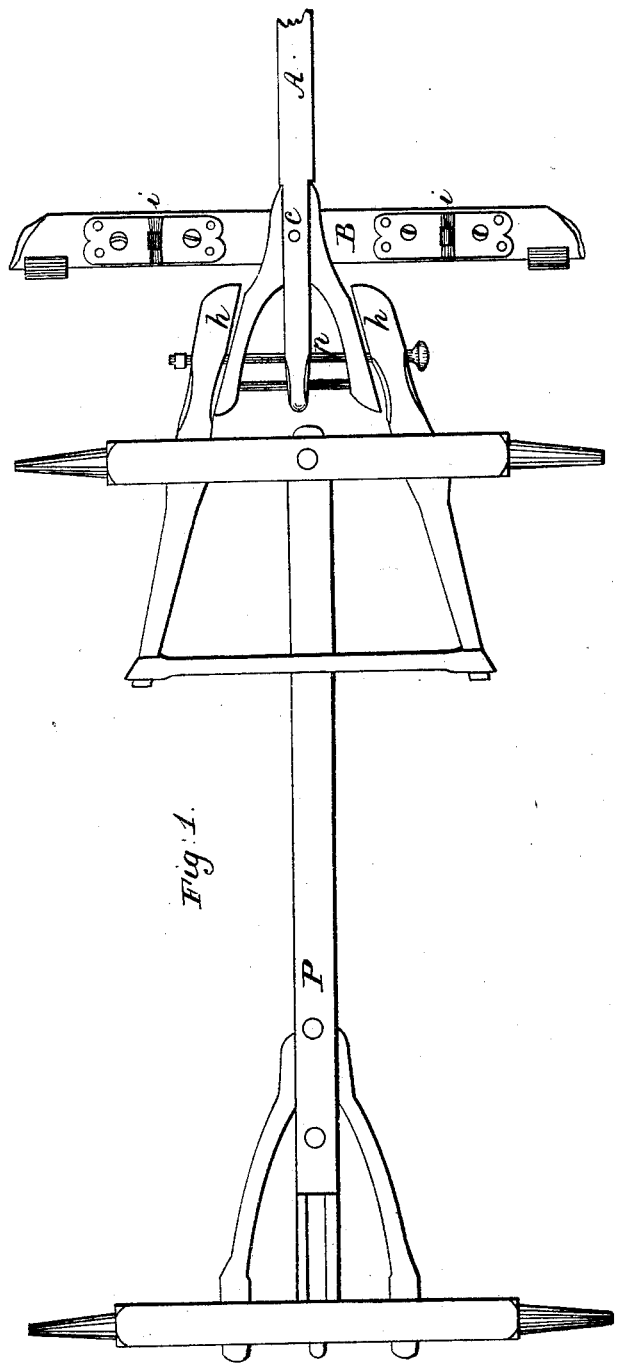

Figure 1 represents a plan view; Fig. 2 a front view, and Fig. 3 a transverse section in the line 1, 2.

The letters of reference indicate the same parts in the different figures.

The nature of my invention consists in so constructing a wagon brake, operated by the holding back of the team, that, while the wagon is prevented from going forward, no impediment is offered to backing; and also in the construction of the perch the length of which can be regulated at pleasure.

The following is a description of my invention: A, is a tongue of the usual construction to the forward end of which the team is secured by a yoke or breast strap.

B is the brake bar pivoted to the tongue in the center at C, that it may have an equal bearing upon both front wheels.

The tongue is secured in the hounds $h$, by a pin $p$, passing through them in mortises which admit of a backward and forward movement of the tongue sufficient to keep the brakes clear of the wheels when going forward and to allow them to bear upon the wheels when held back. The brake bar has hinge joints $i$, near the brakes at each extremity, which admit of the yielding of the brakes in an upward direction only when the wagon is backed.

It will be perceived that when the wagon is going down hill, and the team is holding back, the tendency of the portion of the rim of the wheel, in contact with the brake is downward, it there meets with the resistance of the friction of the brake, and while the wagon is retarded thereby, the brake bar retains its rectilinear form, but when the wagon is in the act of being backed, the motion of the portion of the rim in contact with the brake being upward, the ends of the brake bar are lifted (as shown in Fig. 2) the hinges yielding to the friction and the brakes offering no resistance. This arrangement therefore constitutes an effectual brake, always ready for action without manual interposition, yet offering no impediment to the backing of the wagon.

The perch P, is grooved upon its upper and lower sides to correspond with tongues $t$, upon the upper and lower irons which fit therein, the irons unite at their forward ends, and receive the king bolt which connects the perch with the fore axle, this perch is capable of extension, and can be fixed at any desired length by pins, passing through holes in the irons, and the perch.

Having thus described my improvements, what I claim as my invention and desire to secure by Letters Patent is—

1. The brake bar B, when jointed in the manner and for the purpose herein set forth.

2. The extension perch, constructed in the manner herein specified.

In testimony whereof I have signed my name to this specification before two subscribing witnesses.

B. B. MUNROE.

Witnesses:
A. W. CHASE,
D. H. WILCOX.